June 15, 1926.
1,589,337
H. SEVERIN
REMOVAL OF GLASS FROM GLASS FURNACES
Filed Sept. 25, 1925    2 Sheets-Sheet 1
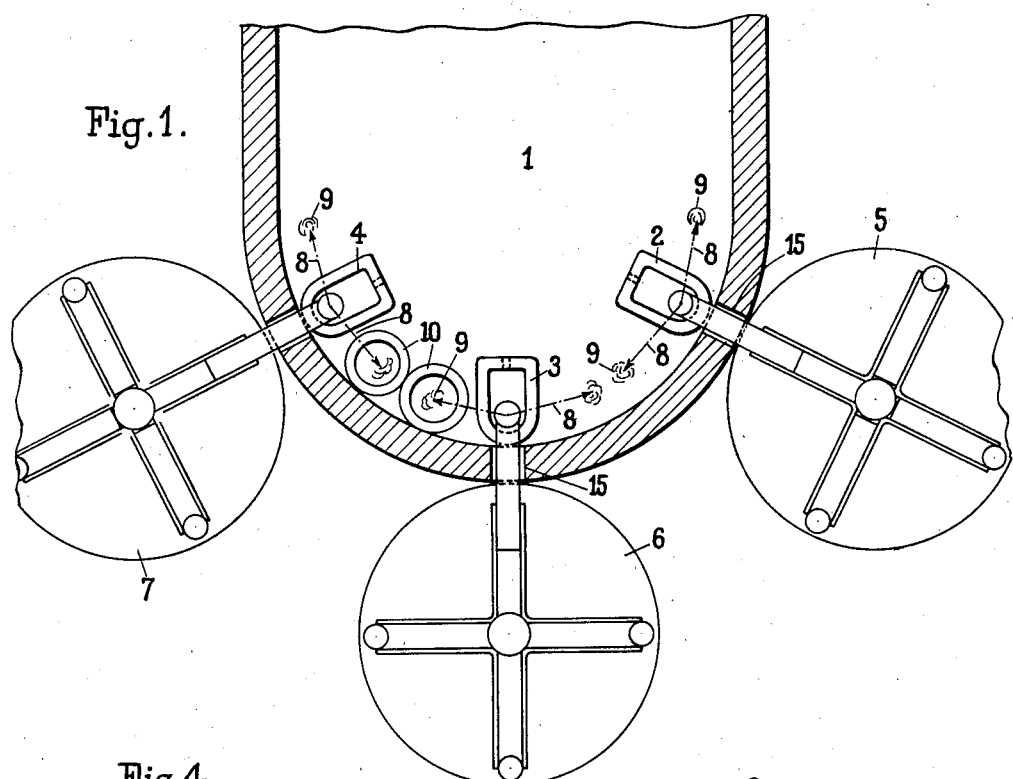
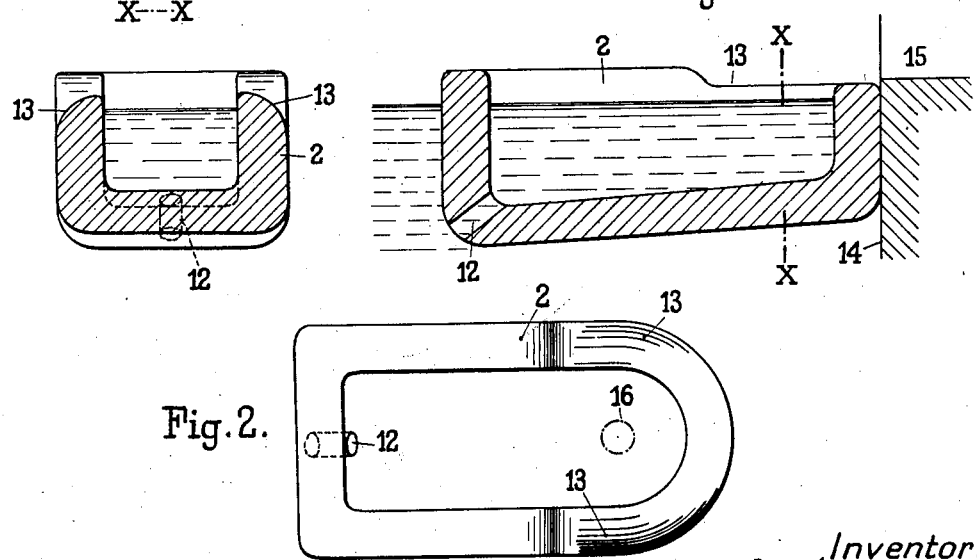
Inventor:
H. Severin
By Marks & Clerk
attys June 15, 1926.  1,589,337
H. SEVERIN
REMOVAL OF GLASS FROM GLASS FURNACES
Filed Sept. 25, 1925   2 Sheets-Sheet 2

Inventor:
H Severin
By Marks & Clerk
attys

Patented June 15, 1926.

1,589,337

UNITED STATES PATENT OFFICE.

HEINRICH SEVERIN, OF SASBACH, NEAR ACHERN, BADEN, GERMANY.

REMOVAL OF GLASS FROM GLASS FURNACES.

Application filed September 25, 1925, Serial No. 58,651, and in Germany September 23, 1924.

This invention relates to improvements in and a simplification of the filling method in glass moulding machines of the type working on the Owens principle, which supply themselves with glass by suction.

In such machines the lower, open side of the mould is brought into contact with the surface of the glass bath and the liquid glass is drawn into the mould by suction. Through dipping the metal mould into the glass, however, the glass in the neighbourhood of the filling place is cooled and has to be heated up again before the next filling operation, which occupies a considerable time. Hence it is usual to employ rotary tanks, in which the cooled filling place is always brought up again to the melting temperature of the furnace and a freshly heated place of the glass surface is presented to the mould.

The operation of these rotary tanks is inconvenient and is also costly, owing to the increased consumption of coal. Hence various suggestions have been made for rendering these rotary tanks superfluous and withdrawing the glass directly from the furnace by causing the molten glass to circulate in the melting furnace by artificial means, either by devices provided in the furnace itself, such as dipping wheels or the like or by strickles mounted on the rotating mould carrier, which precede or follow the mould. All these attempts have however hitherto been unsuccessful and the various suggestions have proved unsatisfactory.

Another method of withdrawing the glass consists in this, that through an opening provided in the usual manner in the wall of the furnace the mould is introduced into the furnace and dipped into the molten glass. In such an arrangement the dipping place is situated, as is usual in the case of manual work, within a ring or floating member which floats on the molten glass and to which well-clarified glass flows from below. On the mould being raised out of the molten glass and the glass suspended therefrom being separated off by a knife, care must be taken that this superfluous portion of glass shall not fall into the interior of the floating member or ring, but shall fall outside the same, so that the molten glass at the filling place may not be contaminated by the said cut-off piece of glass. Machines working on this principle operate very successfully. This method however is only suitable for very soft and easily melting frits of glass, such as are used for incandescent lamps and the like. For hard bottle glass this method is unsuitable for the reason that the cut-off portion of the glass falls into that part of the tank (or pot) which is most unsuitable for remelting it, namely between the wall of the ring and the wall of the furnace, a place, where not only the flames are obstructed by the floating member or ring, but where it is cooled by the relatively cold furnace wall and by the air entering through the filling opening in the furnace wall, so that a considerable amount of time elapses before it is melted down. In the manufacture of bottles it is not possible in this way to effect more than three fillings of about 750 grams each in the minute at one filling opening. Furthermore the cut-off portions do not melt down sufficiently and soon form a small barricade before the filling opening and thus offer an obstruction to the introduction of the mould.

All these drawbacks are overcome by the method underlying the present invention, by the cutting off of the excess of glass being effected in such a manner that it does not fall between the floating member and the wall of the furnace, but behind or laterally of the said floating member, and it is to be understood that the words "behind or laterally" used in the claims are intended to exclude the case in which the glass falls between the floating member and the wall of the furnace.

To a limited extent the object of the more rapid remelting of the cut-off portion can be effected, if the said portion is thrown towards the back, that is, towards the interior of the furnace. This way of dealing with the cut-off portion however has the drawback, that the said portion will fall too close to the inlet opening of the floating member and there is a danger that portions of the same may reach the interior of the floating member before being thoroughly melted. This drawback may be minimized, by the inlet opening of the floating member being located as far as possible from the place where the cut-off portion drops and in some cases by providing a flat cover over the rear part of the floating member, so that the cut-off portion will fall on the said covering plate, where it will be exposed to the particularly intensive action of the flame.

For machines from which a relatively small amount of glass is withdrawn this method will suffice. In cases where greater quantities have to be withdrawn, however, it is preferable for the cut-off portion to be thrown away laterally, say obliquely downwards.

This method has the following advantages as compared with the methods hitherto in use:

(1) The floating member or ring may be brought forward right up to the wall of the furnace, so that the mould need not be introduced so far into the furnace, is heated to a less extent and is more readily cooled.

(2) With a suitable speed of the knife the cut-off portion of the glass can be thrown laterally into the interior of the furnace at a distance from the floating member, the arrangement being such that the distance can be adapted to the conditions in each case. In all cases the cut-off portion of glass does not fall down directly at the wall of the furnace and also not where it is shielded from the flames by the floating member, but is always fully exposed to the direct heat of the furnace.

(3) The formation of a glass barricade in front of the opening where the mould is introduced is impossible.

(4) Through the cut-off portion of glass being exposed to the direct heat of the furnace, it is possible to remelt it far more rapidly than in the earlier methods. The cut-off portion melts in approximately only half the time formerly required, that is, in about 10 seconds at the usual melting heat of close upon 1300°.

(5) In machines having a plurality of working units, so-called "carrousel" machines, the cutting operation may be effected alternately to one or the other side of the floating member, so that double the number of fillings may be taken from the same working opening.

The new method may be carried out with the ordinary means and operates as at present used in various ways. When the method is applied to pot furnaces, it is preferable for the ordinary continuous pots to be so constructed as to prevent with certainty the cut-off portion of glass falling outside the pot.

For the rest the mould may be introduced in the usual manner horizontally or vertically into the furnace. The rotating and radially movable mould of the Westlake machine, described in German Patent 277,469, may also be used.

For cutting off the superfluous portion of glass laterally, both the ordinary knife of the Owens machine and that of the automatic Severin machine may be used.

In the accompanying drawings only the arrangement of the floating members in front of the opening for the withdrawal of glass are shown diagrammatically.

The floating members have more or less the shape of the well-known floating members with the exception that the upper edge at the front end of the floating member, that is, at the place at which the cutting off operation is effected, is made somewhat lower, inclined downwards to the outside and bevelled off.

Fig. 1 shows by way of example in plan view the arrangement of three such "carrousel" machines close to the wall of the furnace, each machine having four arms.

Figs. 2, 3 and 4 are a plan view and sections respectively of the floating member employed

Figure 5:
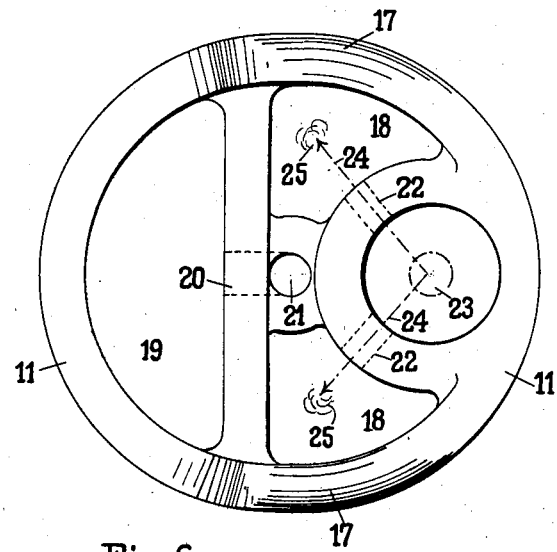
Figs. 5 and 6 are a plan view and a section of an uninterruptedly working pot, such as is suitable with the new method.

In the first figure 1 is the interior of the tank, in which the floating members 2, 3 and 4 are located in the usual manner behind the openings 15 for the withdrawal of glass. In front of the furnace 3 four-armed machines 5, 6 and 7 are indicated diagrammatically, a filling mould being shown in each case as having been introduced into the furnace. The arrows 8 indicate the direction, in which the cut-off portions of glass are thrown preferably alternately to the right and left, so that they fall on to the surface of the glass at 9. 10 are the clarifying rings which may be so placed in the frit in the furnace that the place where the cut-off portion of glass falls lies within them.

Figs. 2, 3 and 4 show in plan view, transverse and longitudinal section respectively the floating member 2 preferably used for the present method with the tank furnace. 12 is the hole through which the frit enters, 16 the place where it is withdrawn, 14 the wall of the furnace and 15 the opening for the introduction of the mould into the furnace. The floating member differs from those commonly used only in this that at 13 the wall is slightly depressed and bevelled off, for facilitating the throwing off of the cut-off portion and for making it difficult for it to enter the floating member.

Figure 6:
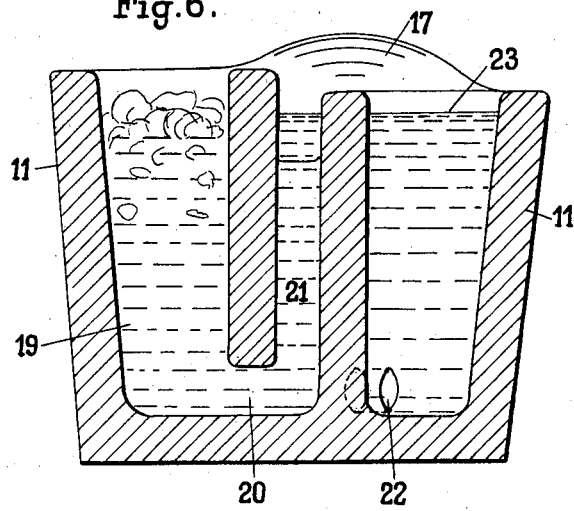

The continuously operating pot shown in Figs. 5 and 6 in plan view and longitudinal section for continuous working differs from those commonly used in this that its walls are slightly raised at 17 and may be slightly bent outwards laterally, for catching the cut-off portion of glass and guiding it back into the clarifying space 18 of the pot. 11 are the walls of the pot, 19 is the space where the frit is introduced and 18 the clarifying space, which are in communication in a known manner by the opening 20 and the passage 21. From the clarifying space 18 the glass passes through the opening 22 into the withdrawal space, the place of withdrawal being at 23. 17 are laterally raised portions of the wall of the pot, 25 the places where the cut-off portions of glass fall and 24 the direction, in which the cut-off portions may be thrown alternately.

What I claim is:—

1. A method of withdrawing glass directly from a glass furnace having definite dipping chambers and clarifying rings for the mould, consisting in this that the mould is inserted into the molten glass at the dipping chamber and the glass adhering to the mould, when the latter is withdrawn, is cut off and thrown into the clarifying rings externally of the dipping chamber, as and for the purpose set forth.

2. A method of withdrawing glass directly from a glass furnace having definite dipping chambers for the mould, consisting in this that the mould is inserted into the molten glass at the dipping chamber and the glass adhering to the mould, when the latter is withdrawn, is cut off and thrown into the molten glass contained in the furnace alternately to the right and left of the dipping chamber, as set forth.

3. An apparatus for withdrawing glass directly from a glass furnace, comprising in combination a plurality of dipping chambers in the furnace containing molten glass, holes in the side walls of the said furnace, moulds capable of being inserted and withdrawn through the said holes and of being dipped into the said dipping chambers and clarifying rings in the molten glass in the proximity of the said dipping chambers, as set forth.

4. An apparatus for withdrawing glass directly from a glass furnace, comprising in combination a plurality of dipping chambers in the furnace containing molten glass, holes in the side walls of the said furnace and moulds capable of being inserted and withdrawn through the said holes and of being dipped into the said dipping chambers, the said dipping chambers having that portion of the upper edge of their walls, which faces the wall of the furnace, lower than the rest of the wall and bevelled downwards to the outside, as set forth.

In testimony whereof I have signed my name to this specification.

HEINRICH SEVERIN.